(12) United States Patent
Nielson et al.

(10) Patent No.: US 8,204,825 B2
(45) Date of Patent: Jun. 19, 2012

(54) SYSTEM, METHOD AND COMPUTER PROGRAM PRODUCT FOR PROCESSING PAYMENTS

(75) Inventors: Douglas B. Nielson, Cranbury, NJ (US); Charlie L. Kimes, Scottsdale, AZ (US); Scott K. Chow, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 174 days.

(21) Appl. No.: 11/865,789

(22) Filed: Oct. 2, 2007

(65) Prior Publication Data
US 2009/0024471 A1 Jan. 22, 2009

Related U.S. Application Data

(60) Provisional application No. 60/949,928, filed on Jul. 16, 2007.

(51) Int. Cl.
*G06Q 40/00* (2006.01)
(52) U.S. Cl. .......... 705/40; 39/71; 39/26; 39/44; 39/65; 39/36; 39/76; 709/250
(58) Field of Classification Search .............. 705/39–40, 705/44, 26, 65, 76
See application file for complete search history.

(56) References Cited

U.S. PATENT DOCUMENTS

| | | | |
|---|---|---|---|
| 6,072,870 A | | 6/2000 | Nguyen et al. |
| 6,304,915 B1* | | 10/2001 | Nguyen et al. ............... 709/250 |
| 2001/0039535 A1* | | 11/2001 | Tsiounis et al. ............... 705/71 |
| 2002/0002533 A1* | | 1/2002 | Singhal ........................... 705/39 |
| 2003/0229590 A1 | | 12/2003 | Byrne et al. |
| 2004/0078276 A1* | | 4/2004 | Shimogori ...................... 705/26 |
| 2004/0107170 A1 | | 6/2004 | Labrou et al. |
| 2004/0260657 A1* | | 12/2004 | Cockerham .................... 705/76 |
| 2005/0065881 A1 | | 3/2005 | Li et al. |
| 2005/0071512 A1* | | 3/2005 | Kim et al. ....................... 710/1 |
| 2006/0149671 A1 | | 7/2006 | Nix et al. |

OTHER PUBLICATIONS

"Global E-Commerce: A Lesson in Service: Remember the bad old days, circa 1999, when brash dot-com banks predicted the imminent demise of traditional brick-and-mortar financial institutions?(third party processors)"; Talley, David; Bank Technology News , p. 45; Sep. , 2002; ISSN: ISSN: 1060-3506.*

"Global E-Commerce: A Lesson in Service: Remember the bad old days, circa 1999, when brash dot-com banks predicted the imminent demise of traditional brick-and-mortar financial institutions?(third party processors)"; Talley, David; Bank Technology News , p. 45; Sep. 2002; ISSN: ISSN: 1060-3506.*

(Continued)

*Primary Examiner* — Harish T Dass
(74) *Attorney, Agent, or Firm* — Snell & Wilmer L.L.P.

(57) ABSTRACT

A payment processor for providing a payment service includes a transaction processor to process a transaction request. An application programming interface links a merchant to the transaction processor based on an identifier. A merchant center, located between a gateway and a point of sale device of the merchant, queries a database for information associated with a buyer and the merchant based on information received from the point of sale device, to generate the transaction request based from merchant transaction data received from the point of sale device and the information associated with the buyer and the merchant received from the database, and to communicate the transaction request to the transaction processor. The transaction processor also communicates information associated with the transaction request with the merchant based on the identifier.

18 Claims, 5 Drawing Sheets

OTHER PUBLICATIONS

International Search Report and Written Opinion of the International Searching Authority, PCT/US08/66402, Aug. 20, 2008.

PCT; International Preliminary Report on Patentability dated Jan. 19, 2010 in Application No. PCT/US2008/066402.

* cited by examiner

SYSTEM, METHOD AND COMPUTER PROGRAM PRODUCT FOR PROCESSING PAYMENTS

CROSS REFERENCE TO RELATED APPLICATION

This application claims priority to, and the benefit of, U.S. Provisional Patent Application Ser. No. 60/949,928, filed Jul. 16, 2007, which is hereby incorporated by reference in its entirety.

BACKGROUND OF THE INVENTION

1. Field of the Invention

The present invention generally relates to alternative payment systems, and more particularly to a system, method and computer program product for providing registration, integration, payment processing and data capture.

2. Related Art

The primary way consumers pay for items online is with the use of financial transaction instruments (e.g., credit or debit cards or "plastic"), where a user enters card and shipping information after having selected one or more items. Alternative-payment systems have been developed to provide alternative means of transaction processing, both for the buyer and the merchant. Examples include payment services such as Google Checkout, Bill Me Later, and eBay's PayPal.

One common aspect of many alternative payment systems is the registry function, which requires customers to preload information such as personal information and transaction account information into registry databases. Consumers opt-in and provide these systems with their personal information as well as transaction account information.

The payment form accepted by various alternative payment systems may differ, however. For example, some allow the buyer to pay with a credit or debit card versus paying with a checking account.

From the buyer's perspective, one advantage of alternative payment systems is that only one set of buyer credentials is necessary to use multiple commerce sites. If, for example, a buyer's credit card expires or needs to be reissued because of fraud or some other reason, with alternative payment systems the buyer is not required to go to all of the commerce sites with which the buyer transacts and change any saved card info. Instead, at worst, the buyer need only make one change.

On the merchant side, conventional alternative payment systems require a merchant to create new processes and technology each time a new payment form is added to a merchant's infrastructure. This involves building entirely new linkages to accommodate the new payment solutions. Reconfiguring such an infrastructure can be costly and therefore not practical for some businesses.

Notwithstanding the benefits provided by existing alternative payment systems, there is a need for a payment solution which maintains customer privacy, provides fast, secure and convenient payment functionality while reducing the integration requirements for merchants. There also is a need to maintain buyer privacy while collecting aggregate data about purchases made through such payment solutions and providing consumer approved services.

Given the foregoing, what is needed is a system, method and computer program product for processing payments.

BRIEF DESCRIPTION OF THE INVENTION

The present invention meets the above-identified needs by providing a system, method and computer program product for processing payments. In one embodiment, a system for providing a payment service includes a transaction processor configured to process a transaction request. The system further includes an application programming interface operable to link a merchant to the transaction processor based on an identifier. Also included in the system is a merchant center, located between a gateway and a point of sale device of the merchant, configured to query a database for information associated with a buyer and the merchant based on information received from the point of sale device, to generate the transaction request based from merchant transaction data received from the point of sale device and the information associated with the buyer and the merchant received from the database, and to communicate the transaction request to the transaction processor. The transaction processor is further configured to communicate information associated with the transaction request with the merchant based on the identifier.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

The present invention, which is directed to a system, method and computer program product for processing payments, is now described in more detail herein in terms of the above exemplary credit or debit card and banking payment processing system. This is for convenience only and is not intended to limit the application of the present invention. In fact, after reading the following description, it will be apparent to one skilled in the relevant art(s) how to implement the following invention in alternative embodiments involving different types of payment methods (e.g., electronic checking, money order, wire transfer, electronic cash, etc.).

The terms "buyer," "user," "end user," "consumer," "customer," "participant," and/or the plural form of these terms may be used interchangeably to refer to those persons or entities capable of accessing, using, being affected by and/or benefiting from the tool that the present invention provides for processing payments.

Furthermore, the terms "service establishment" ("SE"), "business," "merchant," "seller" and/or the plural form of these terms may be used interchangeably and shall mean any person, entity, distributor system, software and/or hardware that is a provider, broker and/or any other entity in the distribution chain of goods or services. For example, a merchant may be a grocery store, a retail store, a travel agency, a service provider, an online merchant or the like.

A "transaction account" as used herein refers to an account associated with an open account or a closed account system. The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

Figure 1:
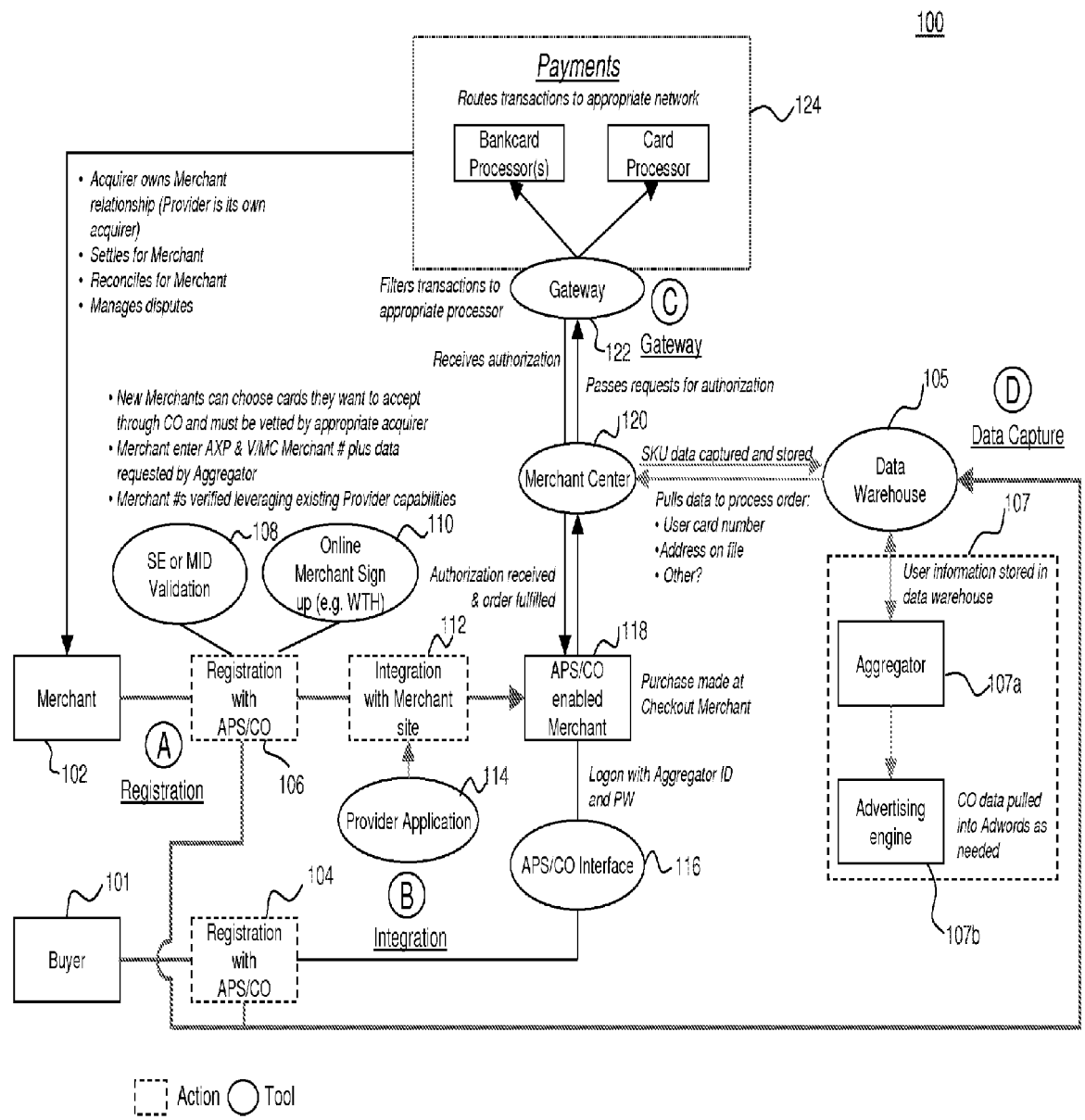
FIG. 1 is a system diagram of an exemplary payment processing system 100 in accordance with an embodiment of the present invention.

FIG. 1 is a system diagram of an exemplary payment processing system 100 in accordance with an embodiment of the present invention. Generally, system 100 includes four components: registration (A), integration (B), gateway (C), and data capture (D). These components are arranged so as to maintain a buyer's privacy at a point-of-sale while providing convenient purchasing and payment functionality. This arrangement further provides merchants with an alternative payment solution supported by gateway linkages to multiple types of transaction processors used to receive payments and leveraging any existing infrastructure.

The registration component (A) of system 100 includes a buyer interface 101, such as a home computer, a mobile phone, or other device connected to a network such as an e-commerce network on the Internet. Prior to completing a transaction, a buyer registers with the provider of the system 100 by entering registration information as depicted in block 104. This process can take place, for example, on a merchant's website just before the buyer checks out. Alternatively, the buyer can preregister directly with the provider. Block 104 represents an exemplary buyer registration process for registering buyers and merchants with either an alternate payment solution ("APS") and/or checkout ("CO") website provider to execute transactions with merchants. This registration information is stored in a database referred to as data warehouse 105. Alternatively, as described below with respect FIG. 5, registration information may be stored in a separate database (not shown).

Before being provided access to system 100, a merchant must be registered. Particularly, a merchant registers with the provider of the APS or CO as shown in block 106.

A merchant that is not registered with a provider or does not have a merchant acquiring account with a transaction processor 124 provides information such as federal tax identifier, merchant name, address, and the like, through an online merchant sign up engine 110. An example of a sign up registration process is American Express's Want-to-Honor ("WTH") registration processing system. A merchant can also apply for additional transaction plans (i.e., banking options, credit card issuers, and the like) through the online merchant sign up engine 110.

Once registered with a transaction processor 124, such as a credit or debit card company, bank or other merchant financial transaction instrument acquirer (e.g., a credit or debit card company), the merchant is provided with a virtual point-of-sale ("POS") terminal and a merchant and terminal ID ("MID"). When transacting, the merchant provides the alternative payment system provider with its MID information which, in turn, is received and validated by a MID validation engine 108.

The integration component (B) of system 100 takes the virtual POS and integrates it into the processing components of a merchant's website. This can be implemented by installing application programming interfaces ("APIs") into the merchant's website infrastructure. These APIs allow the relevant financial transaction instrument information of the buyer and transaction information from the merchant (e.g., from the merchant's point of sale device) to be routed to the transaction processor 124 via a merchant center 120 and gateway 122 without the merchant obtaining access during a transaction to the buyer's information such as personal or financial transaction account information.

More particularly, after merchant 102 registers, integration engine 112 installs the APIs to provide links (also referred to sometimes as "feeds") to one or more transaction processors 124 (e.g., acquirer systems). Each link supplies the information necessary to supply a transaction processor 124 with a full set of transaction information necessary to complete a transaction.

Application engine 114 provides online application forms to be filled out by merchants to integrate them with new transaction payment services. Other types of information collecting methods can be used. For example, industry wide standard data files can be imported into forms (e.g., using Extensible Markup Language or "XML"), or downloaded or uploaded, as the case may be, directly into data warehouse 105. In either case, the merchant registration data is stored in data warehouse 105, which is a secure database inaccessible from the transaction processor 124. As shown in FIG. 1, data warehouse 105 is also in communication with an aggregator 107a. Aggregator 107a may be a third-party which submits transactions for payment to a transaction processor 124 on behalf of other merchants who may or may not have direct relationships with merchant acquirers on the network.

The gateway component (C) is a front-end software application that enables financial data to be routed to the respective transaction processors. More particularly, gateway 122 is a server based infrastructure containing software which inserts the buyer and seller details into a payment processing network's authorization infrastructure, such as credit/debit or bank acquirer transaction processor(s) 124.

As the new transaction processors are added to system 100, additional connections are added to system 100 to connect the transaction processors to gateway 122. This is accomplished by configuring the software of the gateway to handle the data structures of the new transaction processor and by adding additional links (sometimes referred to as "pipes") using conventional leased telecommunications lines or internet-based telecommunication protocols.

Once the merchant has registered and been integrated into system 100, a buyer can then shop at a merchant website through its interface 116. This is accomplished, for example, by connecting to the merchant's website and logging in with a login and password if pre-registered. If not pre-registered the buyer may shop and proceed to registration when ready to complete the transaction. It should be understood that other authentication techniques may be utilized instead of a login and password, such as smartcard, biometric, RFID or other form of authentication device or method. Once authenticated, the buyer is transferred to merchant's website 118 which has been enabled to accept the payment solution described herein.

After shopping, the buyer finalizes the transaction by selecting, for example, a "checkout" button (not shown). The checkout page is hosted off of the merchant's website hosted by enabled engine 118. In other words, when he buyer initiates a checkout process, the buyer is then passed from the merchant's website to another, secure website. Alternatively, the checkout page can be hosted by the provider of system 100.

Upon submission of a transaction, the merchant transmits an authorization request to the transaction processor 124 via the enabled merchant engine 118. Logic within merchant center 120 queries the data warehouse 105 for buyer and merchant details and then generates the required authorization request and submission message (for simplicity collectively called "a transaction request") for insertion into gateway 122. The details merchant center 120 obtains from data warehouse 105 include information associated with the buyer such as buyer transaction account information, name, address and the like, and information associated with the merchant such as acquirer identifier and other information required by a particular transaction processor.

The gateway 122, in turn, submits the message to transaction processor 124. In response, the transaction processor 124 provides a response to the authorization request (e.g., approval or decline) to the merchant. The merchant is provided a reference number corresponding to a transaction so that it can track and further process the transaction, but the merchant is not provided the buyer's transaction account information, thereby keeping the buyer's financial transaction account information private during the transaction processing.

The particular codes that are exchanged between the enabled merchant engine 118 and merchant center 120 are messages used between conventional transaction processing systems and merchants. Other new forms of transaction processing messages may be developed and used in addition to, or in place of, the convention transaction messages since the payment solution described herein moves the servicing responsibility to the transaction processor 124. Similarly, reconciliation may be made between transaction processor 124 and the merchant 102 without additional configuration by the merchant.

Data warehouse 105 stores the purchase information (i.e., line item data), such as SKU data, quantity, the buyer's transaction account number, shipping information, and the like, received from merchant center 120. In addition, data warehouse may store buyer information, such as profiles, transaction account information, ship to information, and the like. Other information, such as websites visited, and the like, may also be stored in data warehouse 105.

Data capture component (D) 107 is an optional component which provides the ability for third parties (or the provider of system 100 itself) to collect information about transactions and buyers. The data can be used to enhance the customer's search and shopping experience and other applications per the permission granted by, for example, a user opt-in.

As explained above, data capture component (D) 107 may include an aggregator engine 107*a* which can submit transactions for payment to a transaction processor on behalf of other merchants who may or may not have direct relationships with merchant acquirers on the network. Aggregator 107*a* can also compile and distill the information it receives. Particularly, aggregator engine 107*a* allows a provider or third party to use transaction information for statistical or marketing purposes. Aggregator 107*a* also can be configured to feed information to an advertising search engine 107*b*, which may further analyze the data to provide custom advertising or marketing.

As described above, from the data warehouse 105, the buyer's data is moved to the merchant center 120. Merchant center 120 combines the merchant and buyer data to create a full transaction data set and in turn communicates the financial transaction data to a gateway 122. Thus, the transaction is isolated from the merchant's website and is instead concatenated at the merchant center 120. Similarly, the personal information of the buyer can be isolated from the data capture component 107.

As explained above, gateway 122 routes the transaction data to the appropriate transaction processor 124, such as a bankcard processor or credit card (e.g., American Express or "AXP") issuer. Since the merchant is not provided the buyer's transaction account information during a transaction, the buyer's transaction account information is kept private.

Figure 2:
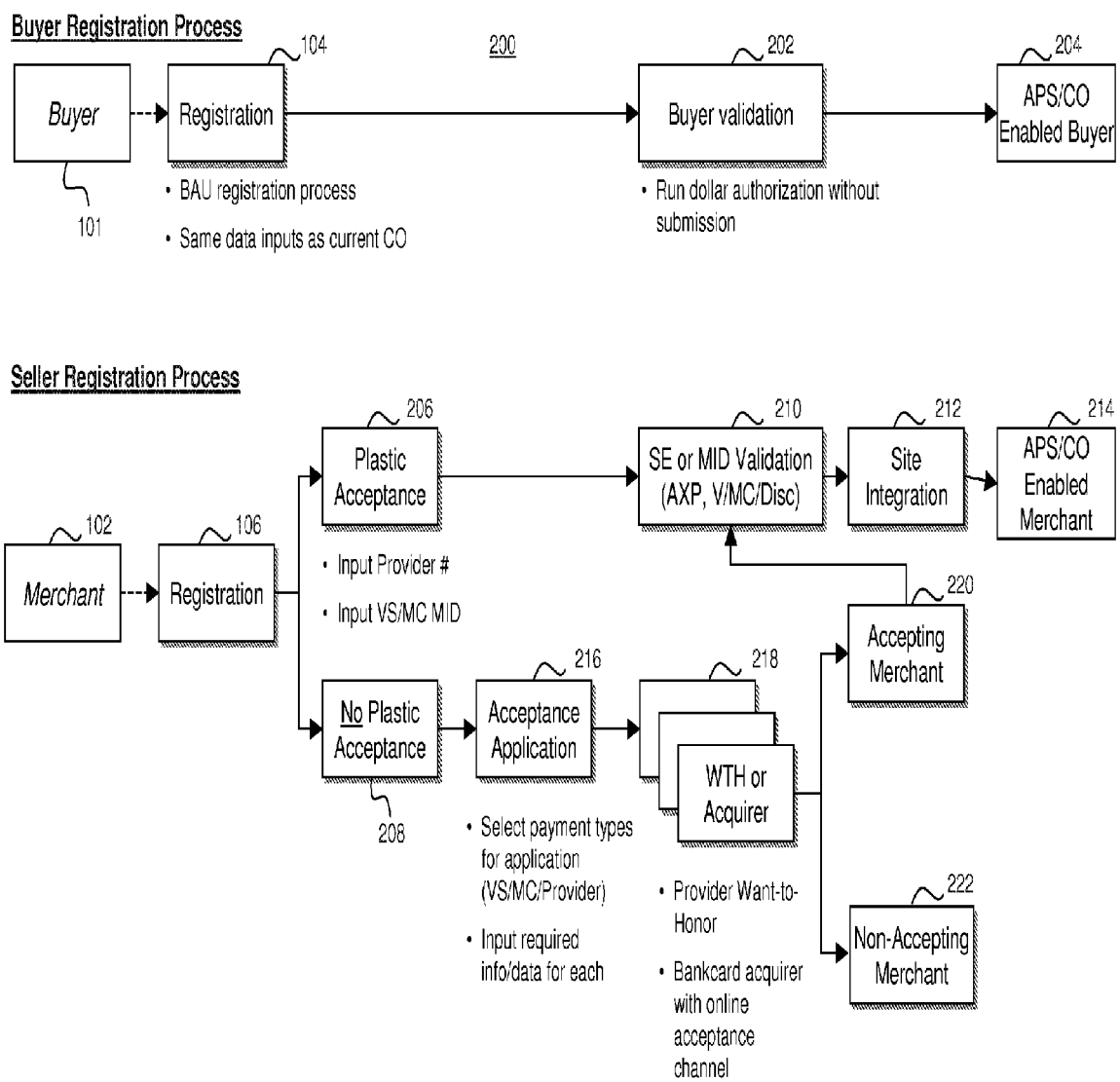
FIG. 2 is a flowchart illustrating buyer and merchant registration processes in more detail, in accordance with an embodiment of the present invention.

FIG. 2 is a flowchart illustrating buyer and seller registration processes 200 in more detail. In one embodiment, the buyer registration process operates in a conventional business-as-usual ("BAU") manner such that the user transaction experience is similar to past transaction experiences. Buyer registration is performed by an operator entering buyer registration information through a buyer interface 101. As the buyer inputs data through buyer interface 101, the data is fed to registration engine 104. Registration engine 104, in turn, performs the steps necessary to register the buyer. Once registration engine 104 has completed registering the buyer, the buyer's spending limit is determined by a buyer validation engine 202. Buyer validation engine 202 performs an authorization process with the transaction processor (i.e., bank or credit card issuer) in order to determine an amount the buyer is authorized to spend. Once registered and validated the buyer is tagged as an enabled buyer as shown in block 204.

Merchant registration is performed by an operator entering seller registration information through establishment (i.e., seller) interface 102. In one embodiment, the seller registration process requires merchants to input additional information initially by using conventional service establishment or merchant identifier numbers to vet plastic-accepting merchants and facilitate registration. By registering up front, service establishments which are not registered to accept plastic can sign up for plastic acceptance through sign-up channels such as American Expresses want-to-honor ("WTH") or bankcard applications. As registration information is entered, it is fed to registration engine 106 which feeds the data to either plastic (e.g., credit/debit card) acceptance engine 206 or non plastic (i.e., non credit card) acceptance. If the merchant wishes to accept plastic, then the service establishment is validated using service establishment or merchant identifier validation engine 210. Once the service establishment validation engine 210 has completed validating the service establishment, the service establishment's website is integrated using site integration engine 212. Once the service establishment is validated and its website integrated using application program interfaces ("APIs"), then the service establishment is an enabled seller as shown in block 214.

If the merchant does not accept plastic (block 208), then the service establishment can choose between various payment types to apply for using acceptance application engine 216. The transaction processor 218 (e.g., credit, debit card, or bankcard acquirer) determines whether the service establishment can establish a transaction account. If the service establishment is not accepted by the transaction processor 218, then the application is rejected, as shown in block 222. If the service establishment is accepted, then at block 220 the service establishment is considered registered and the process continues at block 210, as describe above.

Advantageously, the above described registration processes maintain user privacy at a point of sale. The service establishment is not provided with the buyer or sellers personal profile data since that data is stored in data warehouse 105.

Figure 3:
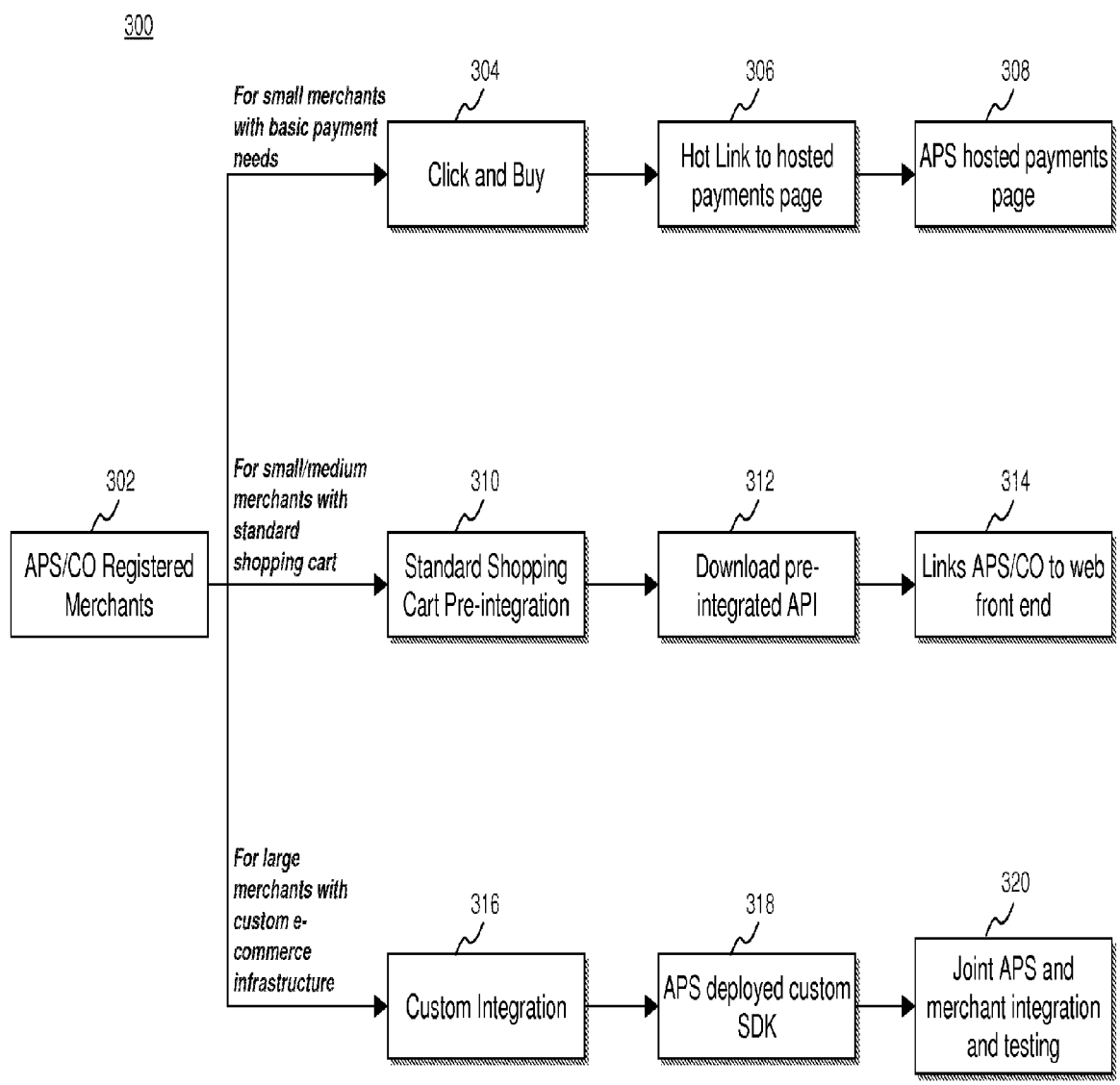
FIG. 3 is a flowchart depicting an integration solution and process 300 in accordance with an embodiment of the present invention.

FIG. 3 is a flowchart depicting an integration process 300 in accordance with an embodiment of the present invention. Process 300 begins after a service establishment has been registered as shown in block 302. Once registered, the service establishment has one of three alternative integration procedures to follow. In the embodiment depicted in FIG. 3, the integration procedure followed by the service establishment depends on the size of the service establishment. For small sellers with basic payment needs, the service establishment can be integrated with a conventional click and buy engine 304, which links to a hosted payment website 306. A hosted payment website allows a third party to process payments on its payment page as shown in block 308. For small to medium sized sellers having a conventional shopping cart, the service establishment integrates using a standard shopping card pre-integration engine 310, which involves downloading pre-integrated application programming interfaces (APIs), as shown in block 312. Once integrated, at block 314, the registered service establishment provides a link from the checkout to the web front end. For large sellers with custom e-commerce infrastructures, a custom integration can be performed as shown in block 316. Once the service establishment is integrated, then an alternative payment solution is deployed using a software development kit ("SDK") and associated libraries as shown at block 318. Once the payment solution has been deployed, a service establishment can join, integrate and test their systems, as shown in block 320.

Figure 4:
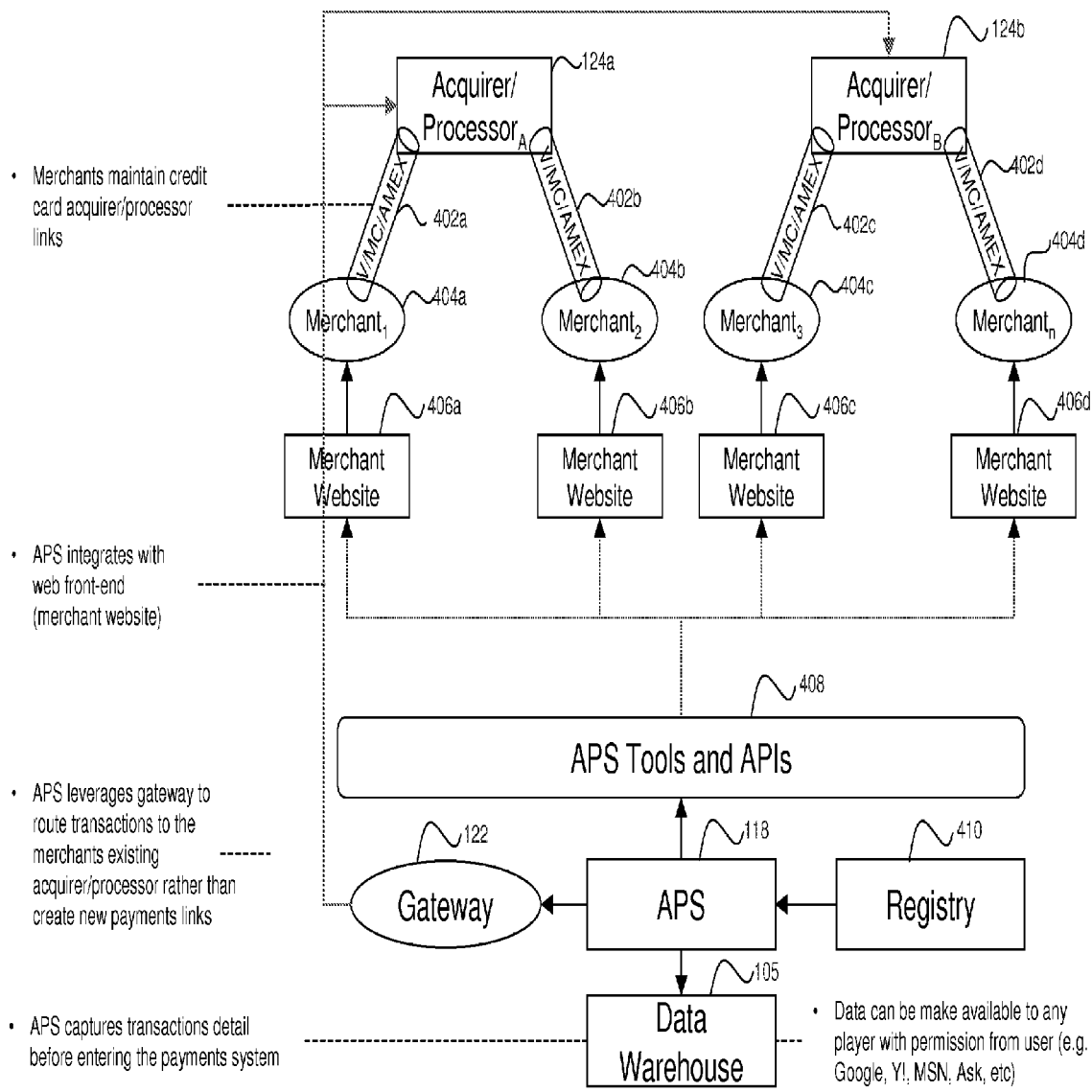
FIG. 4 is a block diagram showing the linkage and API configuration in accordance with an embodiment of the present invention.

FIG. 4 is a block diagram showing the linkages and API configuration in accordance with an embodiment of the present invention. As shown in FIG. 4, transaction processors 124 (e.g., acquirer processors) are linked to merchant systems 404 by acquirer/processor links 402. As described above, Gateway 122 is a front-end software application that enables financial data to be routed to the respective transaction processors 124. As shown, each merchant system 404 maintains its own transaction processor links 402.

A payment solution engine 410 integrates with the web front end of the enabled merchant website 406 using payment solution tools and APIs 408. Payment solution tools and APIs 408 also supply the software and links used to leverage gateway 122 to route transactions to the merchants. By incorporating tools and APIs 408 between the gateway and payment solution (blocks 122, 410, respectively) and merchant systems and websites (blocks 404, 408, respectively), the gateway 122 is leveraged to route transactions to the merchants existing transaction processor 124 rather than require the merchants to create new links. A registry engine 410 feeds the payment solution engine 410 buyer and merchant registration information. In addition, as explained above, data warehouse 105, which may be one or more databases, captures transaction details.

The present invention (i.e., systems and processes 100, 200, 300 and 400) or any part(s) or function(s) thereof) may be implemented using hardware, software or a combination thereof and may be implemented in one or more computer systems or other processing systems. However, the manipulations performed by the present invention were often referred to in terms, such as logging in or filling out a form, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 5:
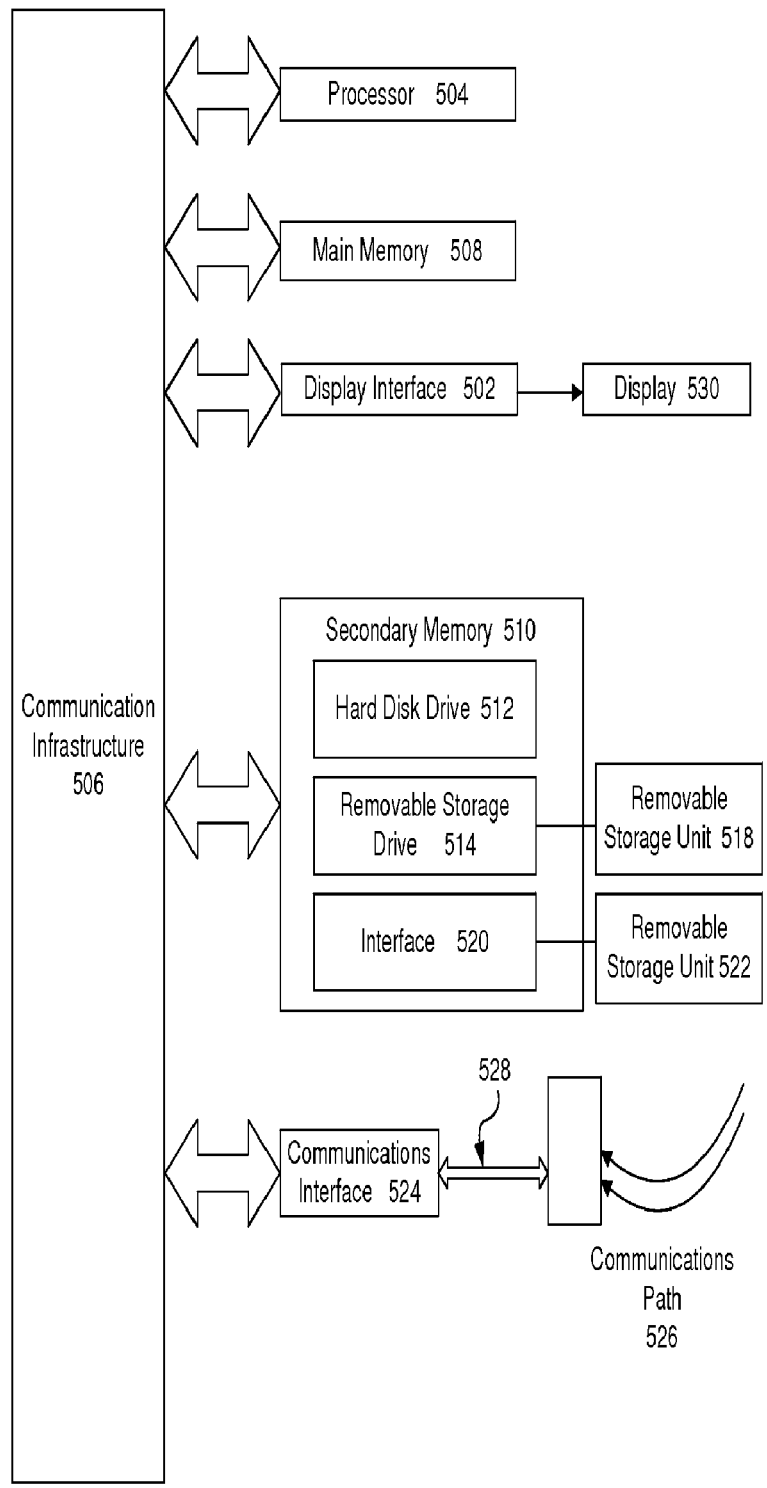
FIG. 5 is a block diagram of an exemplary computer system useful for implementing the present invention.

In fact, in one embodiment, the invention is directed toward one or more computer systems capable of carrying out the functionality described herein. An example of a computer system 500 is shown in FIG. 5.

The computer system 500 includes one or more processors, such as processor 504. The processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 514, a hard disk installed in hard disk drive 512, and signals 528. These computer program products provide software to computer system 500. The invention is directed to such computer program products.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A system comprising:
   a tangible, non-transitory memory communicating with a processor for providing a payment service,
   the tangible, non-transitory memory having instructions stored thereon that, in response to execution by the processor, cause the processor to perform operations comprising:
   registering, by the processor, a merchant with a merchant center; and
   linking, by the processor, a virtual point of sale device and a software application configured to enable financial data to be routed to a transaction processor via the merchant center, wherein the merchant center is configured for:
   querying, by the processor, a database for transaction request information, wherein the database is configured to store information associated with a buyer and merchant transaction data received from the virtual point of sale device, wherein the information associated with the buyer stored in the database is inaccessible to a merchant system, and wherein the information associated with the buyer and the merchant transaction data is pre-stored in the database, wherein the merchant system does not obtain access to personal data or transaction account data of the buyer associated with the transaction request;
   receiving, by the processor, a response to the queried transaction request; and
   generating, by the processor and based on the queried transaction request response, a transaction request comprising the merchant transaction data received from the virtual point of sale device and the information associated with the buyer, wherein the transaction request is provided to a transaction server configured to process the transaction request.

2. The system of claim 1, wherein the merchant center is further configured for registering, by the processor, at least one of the buyer and the merchant.

3. The system of claim 1, wherein the merchant center is further configured for integrating, by the processor, the system by an application program interface into a network infrastructure of a merchant system comprising the virtual point of sale device.

4. The system of claim 1, wherein the merchant center is further configured for submitting, by the processor, the transaction request to the transaction server.

5. The system of claim 1, wherein the merchant transaction data received from the virtual point of sale device stored in the database is inaccessible to the buyer.

6. The system of claim 1, wherein the merchant center is further configured for communicating, by the processor, information to the virtual point of sale device.

7. A method comprising:
   registering, by a computer based system for providing a payment service, a merchant with a merchant center; and
   linking, by the computer based system, a virtual point of sale device and a software application configured to enable financial data to be routed to a transaction processor via the merchant center, wherein the merchant center is configured for:
   querying, by the computer based system, a database for transaction request information, wherein the database is configured to store information associated with a buyer and merchant transaction data received from the virtual point of sale device, wherein the information associated with the buyer stored in the database is inaccessible to a merchant system, and wherein the information associated with the buyer and the merchant transaction data is pre-stored in the database, wherein the merchant system does not obtain access to personal data or transaction account data of the buyer associated with the transaction request;

receiving, by the computer based system, a response to the queried transaction request; and generating, by the computer based system and based on the queried transaction request response, a transaction request comprising the merchant transaction data received from the virtual point of sale device and the information associated with the buyer, wherein the transaction request is provided to a transaction server configured to process the transaction request.

8. The method of claim 7, wherein the merchant center is further configured for registering, by the computer based system, at least one of the buyer and the merchant.

9. The method of claim 7, wherein the merchant center is further configured for integrating, by the computer based system, the system by an application program interface into a network infrastructure of a merchant system comprising the virtual point of sale device.

10. The method of claim 7, wherein the merchant center is further configured for submiting, by the computer based system, the transaction request to the transaction server.

11. The method of claim 7, wherein the merchant transaction data received from the virtual point of sale device stored in the database is inaccessible to the buyer.

12. The method of claim 7, wherein the merchant center is further configured for:

collecting data in a data capture server filtered from the database; and communicating information associated with the collected data to the virtual point of sale device.

13. An article of manufacture including a non-transitory, tangible computer readable medium having instructions stored thereon that, in response to execution by a computer-based system for providing a payment service, cause the computer-based system to perform operations comprising:

registering by the computer based system a merchant with a merchant center; and linking, by the computer based system, a virtual point of sale device and a software application configured to enable financial data to be routed to a transaction processor via the merchant center, wherein the merchant center is configured for:

querying, by the computer based system, a database for transaction request information, wherein the database is configured to store information associated with a buyer and merchant transaction data received from a virtual point of sale device, wherein the information associated with the buyer stored in the database is inaccessible to a merchant system, and wherein the information associated with the buyer and the merchant transaction data is pre-stored in the database, wherein the merchant system does not obtain access to personal data or transaction account data of the buyer associated with the transaction request;

receiving, by the computer based system, a response to the queried transaction request; and generating, by the computer based system and based on the queried transaction request response, a transaction request comprising the merchant transaction data received from the virtual point of sale device and the information associated with the buyer, wherein the transaction request is provided to a transaction server configured to process the transaction request.

14. The computer readable medium of claim 13, wherein the merchant center is further configured for registering at least one of the buyer and the merchant.

15. The computer readable medium of claim 13, wherein the merchant center is further configured for integrating, by the computer based system, the system by an application program interface into a network infrastructure of a merchant system comprising the virtual point of sale device.

16. The computer readable medium of claim 13, wherein the merchant center is further configured for submitting the transaction request to the transaction server.

17. The computer readable medium of claim 13, wherein the merchant transaction data received from the virtual point of sale device stored in the database is inaccessible to the buyer.

18. The computer readable medium of claim 13, wherein the merchant center is further configured for:

collecting data in a data capture server filtered from the database; and communicating information associated with the collected data to the virtual point of sale device.

* * * * *